(12) United States Patent
Willomitzer et al.

(10) Patent No.: US 11,336,883 B2
(45) Date of Patent: May 17, 2022

(54) METHOD AND SYSTEM FOR THREE-DIMENSIONAL SURFACE MEASUREMENT WITH A MOBILE DEVICE

(71) Applicant: Northwestern University, Evanston, IL (US)

(72) Inventors: Florian Willomitzer, Evanston, IL (US); Oliver Strider Cossairt, Evanston, IL (US); Marc Walton, Evanston, IL (US); Chia-Kai Yeh, Evanston, IL (US); Vikas Gupta, Fremont, CA (US); William Spies, Arvada, CO (US); Florian Schiffers, Evanston, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 16/937,045

(22) Filed: Jul. 23, 2020

(65) Prior Publication Data

US 2021/0029346 A1    Jan. 28, 2021

Related U.S. Application Data

(60) Provisional application No. 63/007,524, filed on Apr. 9, 2020, provisional application No. 62/877,401, filed on Jul. 23, 2019.

(51) Int. Cl.
*H04N 5/00* (2011.01)
*H04N 13/254* (2018.01)
(Continued)

(52) U.S. Cl.
CPC ......... *H04N 13/254* (2018.05); *H04N 5/2253* (2013.01); *H04N 5/23218* (2018.08);
(Continued)

(58) Field of Classification Search
CPC ............... H04N 5/2253; H04N 13/254; H04N 2013/0081; H04N 5/23218; H04N 5/232;
(Continued)

(56) References Cited

U.S. PATENT DOCUMENTS

2012/0268571 A1\* 10/2012 Debevec ................. G06T 7/586
  348/48
2017/0205291 A1\* 7/2017 Shimada ................. G01N 21/57
(Continued)

OTHER PUBLICATIONS

Zhang et al. "Full-Field 3D Shape Measurement of Specular Object Having Discontinuous Surfaces". 2017 SPIE, pp. 1-11. (Year: 2017).\*

(Continued)

*Primary Examiner* — Zhihan Zhou
(74) *Attorney, Agent, or Firm* — Bell & Manning, LLC

(57) ABSTRACT

A three-dimensional (3D) imaging system includes a mobile device that has a display screen configured to display a series of patterns onto an object that is to be imaged. The mobile device also includes a front-facing camera configured to capture reflections of the series of patterns off of the object. The system also includes a controller that is configured to control a timing of the series of patterns that appear on the display screen and activation of the front-facing camera in relation to the appearance of the series of patterns.

15 Claims, 14 Drawing Sheets

(51) Int. Cl.
*H04N 5/232* (2006.01)
*H04N 5/225* (2006.01)
*H04N 13/246* (2018.01)
*H04N 13/00* (2018.01)

(52) U.S. Cl.
CPC ... *H04N 13/246* (2018.05); *H04N 2013/0081* (2013.01); *H04N 2013/0096* (2013.01)

(58) Field of Classification Search
CPC ......... H04N 13/246; H04N 2013/0096; G01B 11/2527; G01B 11/24; G01B 2210/52
See application file for complete search history.

(56) References Cited

U.S. PATENT DOCUMENTS

2017/0366802 A1* 12/2017 Hirasawa .............. G03B 35/26
2019/0316898 A1* 10/2019 Kim ................... G01B 11/2441

OTHER PUBLICATIONS

R. Schwarte et al., "New electro-optical mixing and correlating sensor: facilities and applications of the photonic mixer device (pmd)," in Proc. SPIE, vol. 3100 (1997), pp. 3100-3109.
F. Willomitzer et al., "Single-shot 3D motion picture camera with a dense point cloud," Opt. Express, vol. 25, No. 19, pp. 23451-23464 (2017).
R. J. Woodham, "Photometric method for determining surface orientation from multiple images," Opt. Eng., vol. 19, No. 1, pp. 139-144 (1980).
M. C. Knauer et al., "Phase measuring deflectometry: a new approach to measure specular free-form surfaces," in Proc. SPIE, vol. 5457 (2004), pp. 5457-5457-11.
C. Faber et al., "Deflectometry challenges interferometry: the competition gets tougher!" in Proc. SPIE, vol. 8493 (2012), pp. 8493-8493-15.
E. Olesch et al., "Deflectometric self-calibration for arbitrary specular surfaces," in Proceedings of DGaO, (2011).
G. Häusler et al., "Deflectometry vs. interferometry," in Proc. SPIE, vol. 8788 (2013), pp. 87881C-1-87881C-11.
S. Perkins, "New app reveals the hidden landscapes within Georgia O'Keeffe's paintings," Sci. Mag. (2019).
L. Strelich, "Why are Georgia O'Keeffe's paintings breaking out in pimples?" Smithsonian Mag. (2019).
T. Bonfort et al., "Voxel carving for specular surfaces," in Proceedings Ninth IEEE International Conference on Computer Vision, (2003), pp. 591-596 vol. 1.
M. Tarini et al., "3D acquisition of mirroring objects using striped patterns," Graph. Model. 67, 233-259 (2005).
Y. Ding et al., "Recovering specular surfaces using curved line images," in 2009 IEEE Conference on Computer Vision and Pattern Recognition, (2009), pp. 2326-2333.
S. Tin et al., "3D reconstruction of mirror-type objects using efficient ray coding," in 2016 IEEE International Conference on Computational Photography (ICCP), (2016), pp. 1-11.
C. Godard et al., "Multi-view reconstruction of highly specular surfaces in uncontrolled environments," in 2015 International Conference on 3D Vision, (2015), pp. 19-27.
B. Jacquet et al., "Real-world normal map capture for nearly flat reflective surfaces," in 2013 IEEE International Conference on Computer Vision, (2013), pp. 713-720.
Yuankun Liu et al., "Fast and accurate deflectometry with crossed fringes," Adv. Opt. Technol. 3(4), pp. 441-445 (2014).
K. Ikeuchi, "Determining surface orientations of specular surfaces by using the photometric stereo method," in Shape Recovery, L. B. Wolff, S. A. Shafer, and G. E. Healey, eds. (Jones and Bartlett Publishers, Inc., USA, 1992), pp. 268-276.
B. Tunwattanapong et al., "Acquiring reflectance and shape from continuous spherical harmonic illumination," ACM Trans. Graph. vol. 32, No. 4, Article 109, pp.:1-12 (Jul. 2013).
T. Chen et al., "Mesostructure from specularity," in Proceedings of the 2006 IEEE Computer Society Conference on Computer Vision and Pattern Recognition—vol. 2, (IEEE Computer Society, Washington, DC, USA, 2006), CVPR '06, pp. 1825-1832.
A. C. Sanderson et al., "Structured highlight inspection of specular surfaces," IEEE Transactions on Pattern Analysis Mach. Intell., vol. 10, No. 1, 44-55 (Jan. 1988).
S. K. Nayar et al., "Specular surface inspection using structured highlight and gaussian images," IEEE Transactions on Robotics Autom., vol. 6, No. 2, pp. 208-218 (1990).
C. Röttinger et al., "Deflectometry for ultra-precision machining—measuring without rechucking," in Proceedings of DGaO, (2011).
J. Riviere et al., "Mobile Surface Reflectometry," Comput. Graph. Forum, vol. 35, No. 1, pp. 191-202, (2016).
G. P. Butel et al., "Deflectometry using portable devices," Opt. Eng., vol. 54, No. 2, pp. 025111-1-025111-9 (2015).
R. Frankot et al., "A method for enforcing integrability in shape from shading algorithms," IEEE Transactions on Pattern Analysis Mach. Intell. vol. 10, No. 4, pp. 439-451 (1988).
O. Arold et al., "Hand-guided 3D surface acquisition by combining simple light sectioning with real-time algorithms," arXiv e-prints arXiv:1401.1946 (2014).
F. Willomitzer et al., "Flying triangulation—a motion-robust optical 3D sensor for the real-time shape acquisition of complex objects," AIP Conf. Proc. 1537, 19-26 (2013).

* cited by examiner

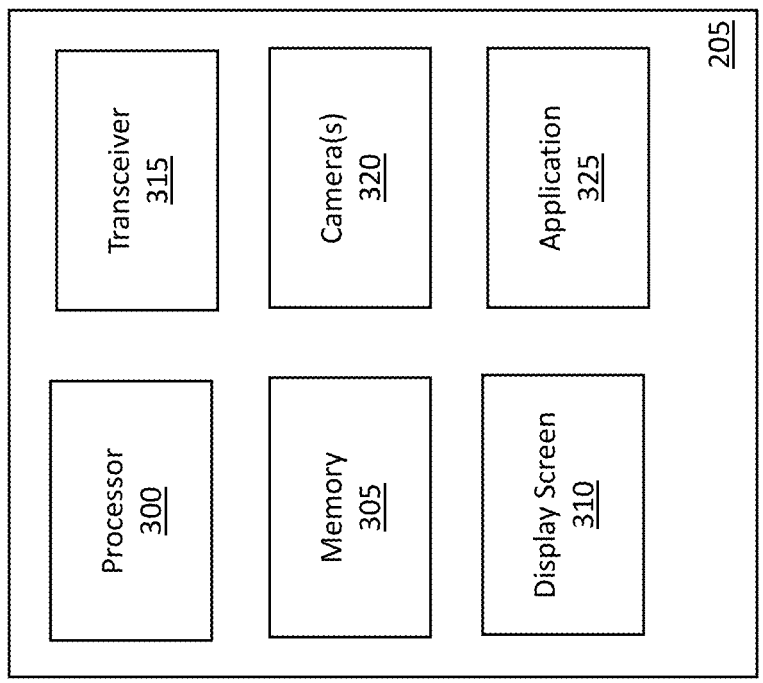

METHOD AND SYSTEM FOR THREE-DIMENSIONAL SURFACE MEASUREMENT WITH A MOBILE DEVICE

CROSS-REFERENCE TO RELATED APPLICATIONS

The present application claims the priority benefit of U.S. Provisional Patent App. No. 62/877,401 filed on Jul. 23, 2019 and U.S. Provisional Patent App. No. 63/007,524 filed on Apr. 9, 2020, the entire disclosures of which are incorporated by reference herein.

REFERENCE TO GOVERNMENT RIGHTS

This invention was made with government support under Grant No. PR-258900-18 awarded by the National Endowment for the Humanities. The government has certain rights in the invention.

BACKGROUND

Three-dimensional (3D) imaging techniques are being used in a multitude of scientific and commercial disciplines. Industrial 3D inspection, factory automation, agricultural imaging, medical 3D imaging, and 3D documentation and analysis of art or cultural heritage artifacts are only a few examples of the broad range of applications. The great popularity of 3D imaging is based on several advantages as compared to traditional two-dimensional (2D) imaging. Compared to a simple 2D image, a three-dimensional object representation is invariant to object translation and rotation, as well as variations in surface texture or external illumination conditions.

SUMMARY

An illustrative three-dimensional (3D) imaging system includes a mobile device that has a display screen configured to display a series of patterns onto an object that is to be imaged. The mobile device also includes a front-facing camera configured to capture reflections of the series of patterns off of the object. The system also includes a controller that is configured to control a timing of the series of patterns that appear on the display screen and activation of the front-facing camera in relation to the appearance of the series of patterns.

An illustrative method for performing three-dimensional (3D) imaging includes displaying, on a display screen of a mobile device, a series of patterns onto an object that is to be imaged. The method also includes capturing, by a front-facing camera of the mobile device, reflections of the series of patterns off of the object. The method further includes controlling, by a controller that is in communication with the mobile device, a timing of the series of patterns that appear on the display screen and activation of the front-facing camera in relation to the appearance of the series of patterns.

Another illustrative three-dimensional (3D) imaging system includes a first mobile device that includes a display screen that is configured to display a series of patterns onto an object that is to be imaged. The system also includes a second mobile device that has a rear-facing camera and a controller. The rear-facing camera is configured to capture reflections of the series of patterns off of the object. The controller that is configured to control a timing of the series of patterns that appear on the display screen and activation of the rear-facing camera in relation to the appearance of the series of patterns.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIG. 3A is a block diagram depicting components of the mobile device of the 3D imaging system in accordance with an illustrative embodiment.

DETAILED DESCRIPTION

In traditional systems, the benefits of 3D imaging, as compared to 2D imaging, do not come without a price. Three-dimensional image acquisition is not as easy or as straightforward as taking a 2D snapshot with a mobile phone camera. As a first consideration, one must pick the appropriate 3D imaging technique for the object to be measured. This decision is strongly dependent on the microscopic surface structure of the object, which can be roughly divided into two categories: diffuse (or scattering) and specular. Diffusely scattering surfaces are commonly measured by projecting a temporally or spatially structured light beam onto the object and evaluating the back-scattered signal. Time-of-Flight (ToF) imaging and Active Triangulation (or Structured Light) imaging are prominent examples. Another imaging procedure is referred to as Photometric Stereo, where the object surface is sequentially flood illuminated with point light sources from different angles.

Unfortunately, the application of the aforementioned imaging principles to specular surfaces yields only limited success. The reason for this is straightforward in that specular reflections from a point light source scarcely find their way back into the camera objective. Depending on the distribution of surface normals with respect to light source and camera position, only a few sparse (and probably overexposed) specular spots may be visible in the camera image. The same problem is also common for interferometric instruments, which can accurately measure smoothly varying specular surfaces with high precision, but fail for specular surfaces with a large angular distribution of surface normals.

Figure 1:
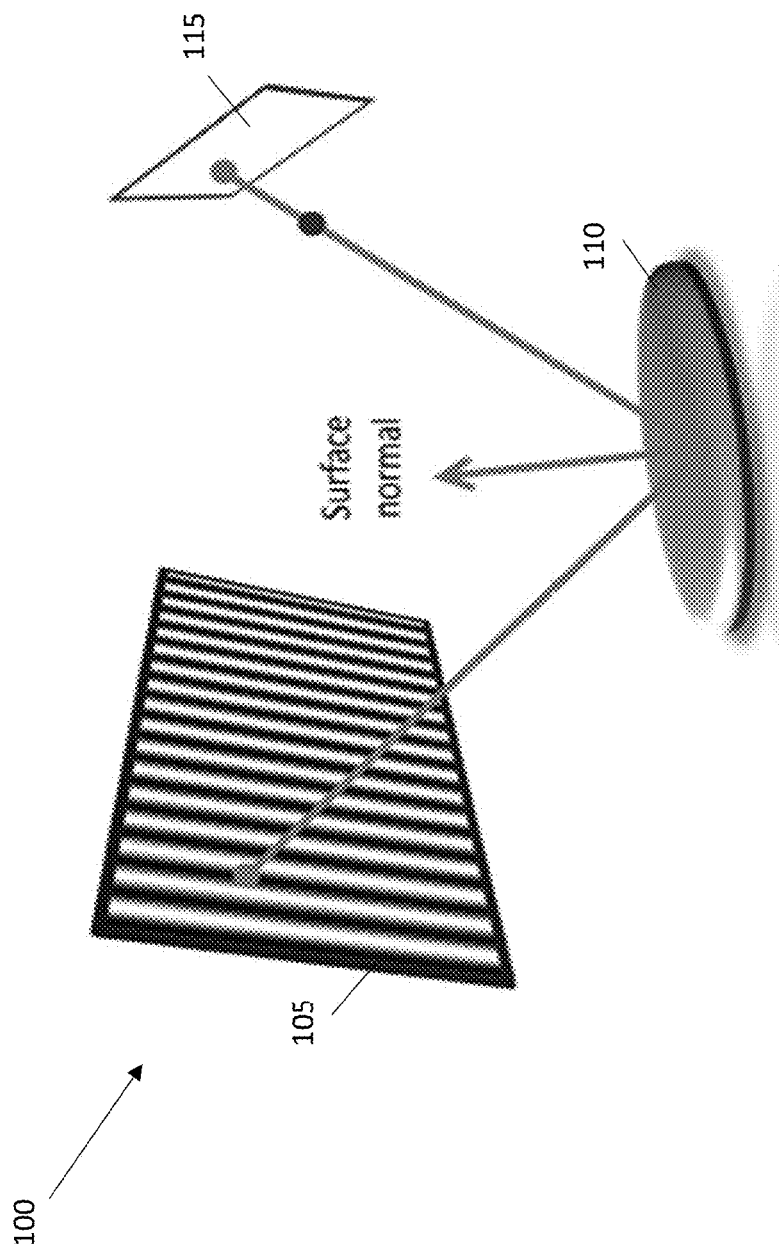
FIG. 1 depicts a Phase-Measuring Deflectometry (PMD) system in accordance with an illustrative embodiment.

One solution to this problem is to extend the angular support of the illumination sources. This is the basic principle behind deflectometry, where a patterned screen replaces point-like light sources, as shown in FIG. 1. Specifically, FIG. 1 depicts a Phase-Measuring Deflectometry (PMD) system 100 in accordance with an illustrative embodiment. As shown, a screen 105 with a fringe pattern is positioned over the specular (or reflective) surface of an object 110 that is being imaged. A camera 115 is used to capture reflections off of the object 110. The surface normal of the object 110 is indicated by an arrow. A normal map of the surface of the object 110 can be calculated based on the deformation of the fringe pattern in the captured camera image.

In a PMD system, the screen can be self-illuminated (e.g., a television monitor, computer screen, etc.) or printed. In deflectometry systems, the screen and camera both face the object, which means that the camera observes the specular reflection of the screen over the surface of the object being imaged. The observed pattern in the camera image is a deformed version of the image on the screen, where the deformation depends on the surface normal distribution of the object surface, as shown in FIG. 1. From this deformation, the normal vectors of the surface can be calculated. To calculate a normal vector at each camera pixel, correspondence between camera pixels and projector pixels is determined. A common technique to achieve this is with the phase-shifting of sinusoidal fringes. The resulting Phase-Measuring Deflectometry (PMD) has established itself as powerful technique that is used with great success in industrial applications, e.g. to test the quality of optical components or to detect defects on metallic parts like car bodies. Given a proper calibration, it has been shown that PMD reaches precisions close to interferometric methods.

The PMD imaging procedure is just one of a number of techniques that have been introduced to measure the 3D surface of specular objects. Most of these techniques are closely related to PMD, but differ in the mechanism used to establish correspondence between the screen and camera. In principle any known pattern can be used in place of sinusoidal fringes. Furthermore, the pattern does not even have to be self-illuminated, and will be effective in estimating surface shape as long as there is some prior knowledge of the pattern. For example, some systems utilize the reflection of color coded circles observed by multiple cameras (which also resolves the bas-relief ambiguity). Other systems use self-illuminated screens with patterns such as stripes, multiple lines, or even a light field created from two stacked LED screens. Additionally, screenless methods can be used to analyze environment illumination or track prominent features (e.g. straight lines) in the environment to obtain information about the slope of specular surfaces.

Each of the above-mentioned techniques comes with benefits and drawbacks. For example, some of the techniques that use a static pattern instead of a phase shifted sinusoid are capable of single-shot acquisition. However, this comes at the cost of lateral resolution and/or restricts the surface frequencies that can be measured. Self-calibrating photometric stereo techniques use known reflectance maps of object surfaces to measure their 3D structure. Such approaches can be used for partially specular surfaces, but fail when the surface is too shiny. Other techniques exploit sparse specular reflections produced by photometric stereo measurements for 3D surface reconstruction or refinement.

However, traditional PMD and other imaging systems are limited in their ability to perform 3D imaging of various surfaces. As one example, currently available techniques are unable to perform optimal 3D measurement and analysis of stained glass surfaces, which can be found in larger glass artworks, church windows, or glass reliefs. Such glass surfaces can be composed of hundreds or thousands small colorful glass pieces that are connected with a metal frame. While generally flat in nature, the shape of these small glass pieces is typically not entirely flat. Over the centuries, several glass manufacturers have developed a multitude of techniques to imprint unique three-dimensional structures to the glass surface that reflect and diffract light in a very distinct way. These unique 3D structures can be exploited to match the small glass pieces in a stained glass painting to the individual manufacturers and to trace the circulation of stained glass and the respective historical influence of the manufacturer around the globe. The latter is of significant interest for the cultural heritage community.

The task of digitizing 3D surface types similar to the surfaces of stained glass leads to several fundamental and technical challenges for the 3D metrologist. First, the objects (e.g. church windows) are large and usually not portable. This makes it nearly impossible to transport them to a controlled lab environment for surface measurement. Second, the surfaces to be measured often contain high spatial frequencies and thus a large variation of surface normals. This requires a high spatial resolution and angular coverage of the 3D surface measurement device. Third, the backsides of the objects are largely inaccessible, which rules out all spectroscopy-like methods to characterize the 3D surface. Moreover, some objects can be highly opaque.

The inventors have determined that all of the above challenges can be addressed by using a novel PMD measurement technique. However, most PMD setups are bulky and cannot be applied in the wild. This bulkiness is mainly caused by the large screens used, which are intentionally chosen to provide a large angular coverage and enable measurement over a large range of surface normals.

A proposed solution to this problem is to use mobile devices (e.g., a smart phone, tablet, portable music player, etc.) for PMD measurements. Specifically, the screen of the mobile device can be used to display the patterns and the front-facing camera of the device can be used to image the object surface. Since the screen size of mobile devices is limited, only a small angular range of surface normals can be measured in any single view. To overcome this limitation, the proposed systems utilize feature-based registration, applied to multiple views acquired from different viewing angles. The features are extracted directly from the glass (or other) surface being imaged so that external markers or fiducials are not necessary.

Described herein are systems and methods for the three-dimensional measurement of extended matte surfaces and extended specular surfaces with high surface normal variations. In some embodiments, the proposed system utilizes a mobile hand held device and exploits the screen and front camera of the mobile device for deflectometry-based surface measurements. For reflective surfaces, a specific pattern (e.g. sinusoidal fringes) is displayed on a screen of the mobile device and the surface slope is evaluated via deflectometry. For matte surfaces, a pattern with low frequency (e.g. a gray-wedge) is displayed on the screen of the mobile device and the surface slope is evaluated via methods that are related to photometric stereo. In one implementation for matte surfaces, an intensity gradient technique can be used in which the screen intensity is linearly ramped up through a gradient range (e.g., 0-255).

Using the proposed system, high quality measurements have been demonstrated without the need for an offline calibration procedure. In addition, described herein is a multi-view technique to compensate for the small screen of a mobile device such that large surfaces can be densely reconstructed in their entirety. The proposed system utilizes a self-calibrating deflectometry procedure capable of taking 3D surface measurements of specular objects in the wild (i.e., outside of a laboratory setting).

The proposed system is also accessible to users with little to no technical imaging experience. For example, the proposed system can provide 3D surface measurement capability to museum conservators, tourists, and other end users who may require an imaging system that offers extreme ease of use and minimal computational requirements. To make the system widely accessible, the inventors have developed a platform that allows for a server-side evaluation of the captured 3D data in one embodiment. In such an implementation, the mobile device is used only to capture images and to display the evaluated data.

Described below are the proposed image acquisition and processing operations that enable uncalibrated 3D Deflectometry measurements with mobile devices. Also described is a set of qualitative surface measurements that are sufficient to identify and compare characteristic surface structures, e.g. in stained glass surfaces. Additionally described herein are the extension of the proposed methods and systems to other (partially) specular surface types, such as oil paintings, technical parts, etc.

Figure 2:
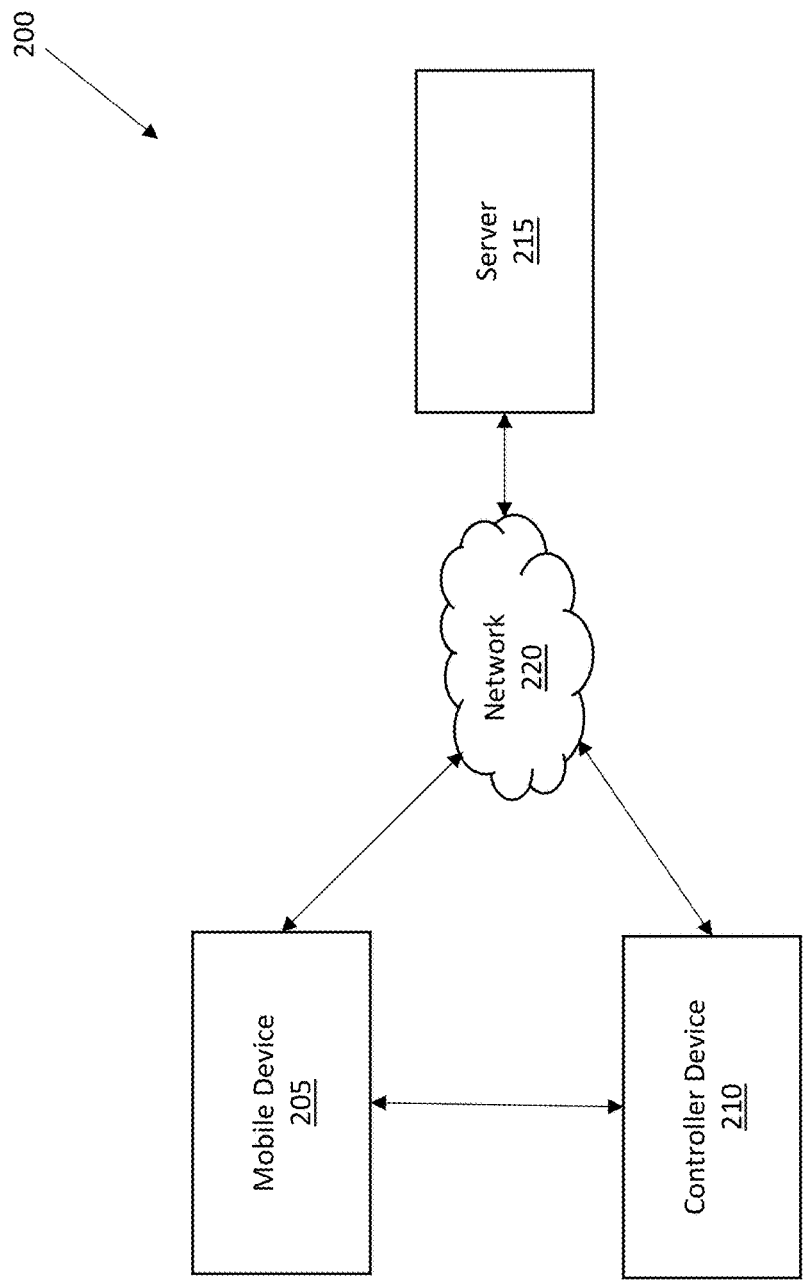
FIG. 2 is a block diagram depicting a 3D imaging system in accordance with an illustrative embodiment.

FIG. 2 is a block diagram depicting a 3D imaging system 200 in accordance with an illustrative embodiment. The 3D imaging system 200 includes a mobile device (or measurement device) 205, a controller device 210, and a server 215. In alternative embodiments, the 3D imaging system 200 can include fewer, additional, and/or different components. For example, the 3D imaging system 200 can also include a portable mounting system that is configured to hold the mobile device in a specific position and orientation relative to an object being imaged. The mobile device 205 can be a cellular phone, a tablet, a laptop computer, a global positioning system (GPS) device, a portable gaming device, a music player, or any other type of mobile computing device. As discussed in more detail below, the mobile device 205 is used as the measurement device that displays a pattern on its screen. The pattern is directed toward an object being imaged, and a front-facing camera of the mobile device 205 is used to capture data/images which can be used to form a 3D image of the object. While many of the embodiments described herein include a mobile device, it is to be understood that the imaging techniques described herein can be used with any computing device that includes a screen and a camera. For example, the proposed imaging techniques can be implemented on stationary devices such as a desktop computer, kiosk computer, etc. that includes a screen and a camera. Thus, in some embodiments, the mobile device 205 can be replaced by a stationary computing device.

The controller device 210 can be a mobile device similar (or identical) to the mobile device 205. Alternatively, the controller device 210 can be a stationary device such as desktop computer. In one embodiment, the controller device 210 can be a small remote control (similar to a television remote) that is used to control operation of the mobile device 205. The controller device 210 can be local to or remote from the mobile device 205, depending on the system. The controller device 210 is used to control the screen and at least a front facing camera of the mobile device 205 such that the mobile device captures image data and/or images of a surface of an object. Specifically, the controller device 210 starts and monitors the measurement conducted by the mobile device 205. The controller device 210 can also be used to display a final result of the measurement. The server 215 is used to process the image data and/or images of the surface of the object captured by the mobile device 205 such that a 3D image can be formed. Besides being able to provide higher performance as compared to a mobile device, evaluating the data on the server 215 can provide other important benefits. For example, code changes (updates) can be directly made on the server 215 without the need for a user to install a new version of the measurement application on the mobile device 205. Moreover, the server 215 can store the evaluated data and work as a database, e.g. for the identification of stained glass pieces or similar fingerprint applications in which artwork, artifacts, etc. are being identified.

In an illustrative embodiment, the mobile device 205, the controller device 210, and the server 215 can communicate with one another via a network 220, which can be the Internet, a cellular network, a local area network (LAN), a wide area network (WAN), etc. Additionally, any of the mobile device 205, the controller device 210, and the server 215 can communicate directly with one another through a wired or wireless connection, such as a Bluetooth® connection, etc.

FIG. 3A is a block diagram depicting components of the mobile device 205 in accordance with an illustrative embodiment. As shown, the mobile device 205 includes a processor 300, a memory 305, a display screen 310, a transceiver 315, one or more cameras 320, and an application 325. The mobile device 205 can include fewer, additional, and/or different components in alternative embodiments. The controller device 210 and the server 215 can similarly include at least a processor, a memory, a transceiver, application(s), a display screen, etc. The processor 300 can be any type of computer processing component known in the art such as a single core processor, a multiple core processor, a microprocessor, etc. The memory 305, which can be any type of computer storage, is used to store data and algorithms which are used to perform computing functions. The memory 305 can also be used to store the application 325. The display screen 310 can be any type of display known in the art, such as a light-emitting diode (LED) screen, liquid crystal display (LCD), etc. The transceiver 315 is used to facilitate communication directly between devices and/or through the network 220. The transceiver can include elements to facilitate communication via wired connection, wi-fi, Bluetooth®, etc. The one or more cameras 320 include at least a front-facing camera that is used to capture images of and/or data regarding a surface being analyzed.

Figure 3B:
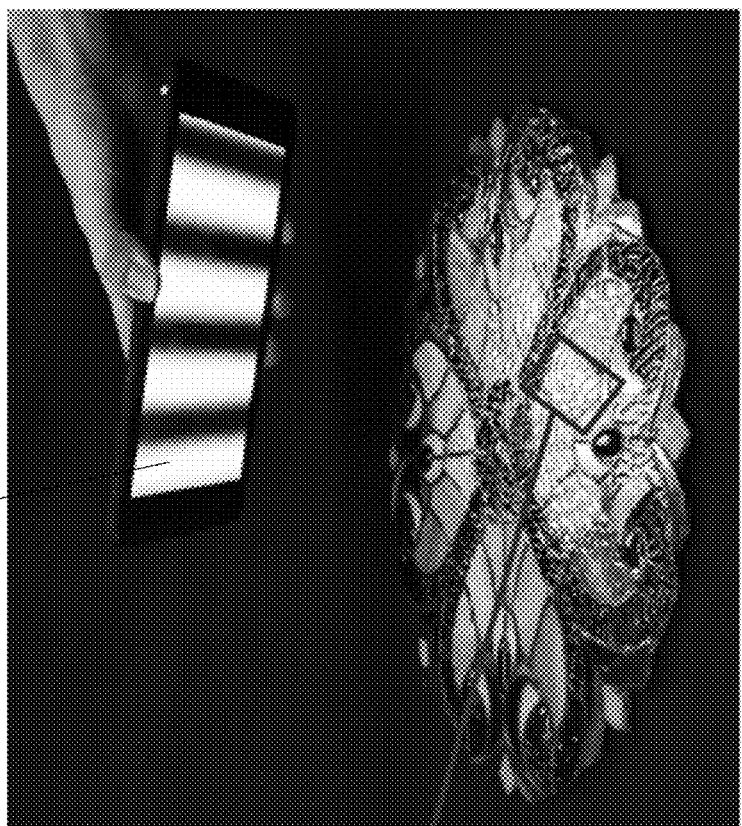
FIG. 3B depicts handheld use of the mobile device to measure a portion of stained glass surface in accordance with an illustrative embodiment.
Figure 3B:
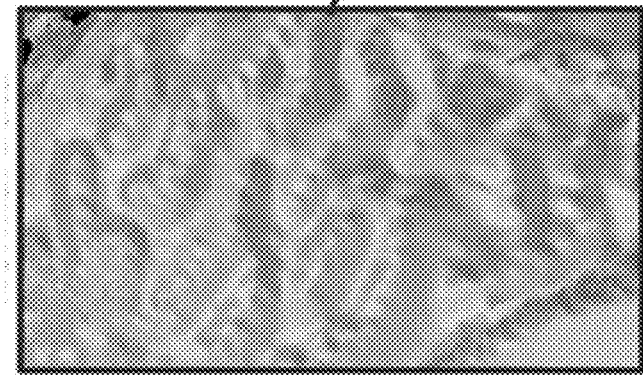

The application 325 is a dedicated program that enables the system to generate 3D images. The application 325, or forms thereof, can be included on each of the mobile device 205, the controller device 210, and the server 215. The application 325 handles the image acquisition process and manages data transfer between the server 215, the mobile device 205, and the controller device 210. FIG. 3B depicts handheld use of the mobile device 205 to measure a portion of stained glass surface in accordance with an illustrative embodiment. The reflections of the screen of the mobile device 205 are visible on parts of the glass surface and are used to reveal its 3D structure. The measurement result, which is a normal map of the boxed area, is displayed in the zoomed inset of FIG. 3B. This procedure is described in more detail below.

In one embodiment, during image acquisition, the controller device 210 causes the mobile device 205 to display phase-shifted sinusoidal patterns and observe an object with its front-facing camera. The mobile device 205 can be positioned approximately 200 millimeters (mm) above/over the surface of the object. Alternatively, different distances can be used based on the screen and optical properties of the camera of the mobile device 205. Because PMD is a multi-shot technique, a sequence of temporally acquired images is used to calculate one 3D image. During the measurement, the display of the mobile device 205 can project four or more 90°-phase-shifted versions of a sinusoid in the horizontal and vertical directions, respectively. There is no limit to the number of phase-shifted versions that can be used. Alternatively, less than 4 (e.g., 3) phase-shifted versions of the sinusoid may be used. Different frequencies of the sinusoid can optionally be used instead of phase shifted signals. In another alternative embodiment, instead of sinusoids, a different pattern may be used such as a pattern of dots, a checkerboard pattern, a pattern of lines, etc. The position of the mobile device relative to the object should remain fixed during the whole acquisition process. Depending on the speed of projection and image acquisition, this can be a hard task for an inexperienced user, if a handheld measurement is desired. For an optimal measurement result, the mobile device can be fixed relative to the object being imaged with a mount. Alternatively, a free-hand guided single-shot principle can be used, as discussed below.

In an alternative embodiment, the 3D imaging system may not include a separate controller device. In such an implementation, the controls can be built into the mobile device 205 itself. In one implementation, a portion of the screen of the mobile device can be dedicated to controls for the system. These controls can enable displaying various patterns on the remainder of the screen and capturing images with the front-facing camera of the reflections of those patterns off of the object being imaged. However, in order to maximize the area that can be imaged in a single shot, it is desirable to use the entire screen of the mobile device to project the patterns (e.g., phase shifted sinusoidal patterns) onto the object being imaged. To enable such usage of the full screen without the use of a separate controller device, the user can enter commands into a user interface on the screen, and after a time delay (that can be set by the user), the mobile device can enter a measurement mode in which the patterns are displayed and the images are captured. Sounds and/or visual cues can also be used to alert the user when the image capture commences and is completed such that the user does not prematurely move the mobile device while image capture is taking place. In another alternative embodiment, a separate server may not be used. In such an implementation, data processing can be performed on the mobile device 205 or the controller device 210 (if used).

In another alternative embodiment, two mobile devices may be used to form the proposed system. A first of the mobile devices is positioned with its display facing the sample that is to be imaged, and is used to project pattern(s) onto the sample. The second mobile device is positioned with its rear-facing camera(s) toward the sample being imaged. The rear-facing camera(s) are used to capture the images of the sample, based on the reflections of the patterns projected by the first device. As a result, the images can be captured with better resolution because rear-facing cameras typically have improved resolution as compared to front-facing cameras in mobile devices. In such an implementation, the second device can also be used as the controller. Additionally, a special mount can be used to hold the two devices relative to one another and the sample. The mount can include a first receptacle configured to receive and hold the first mobile device, and a second receptacle configured to receive and hold the second mobile device. When mounted in the mount, the displays of the first and second devices are facing in opposite (or near opposite) directions.

Figure 4A:
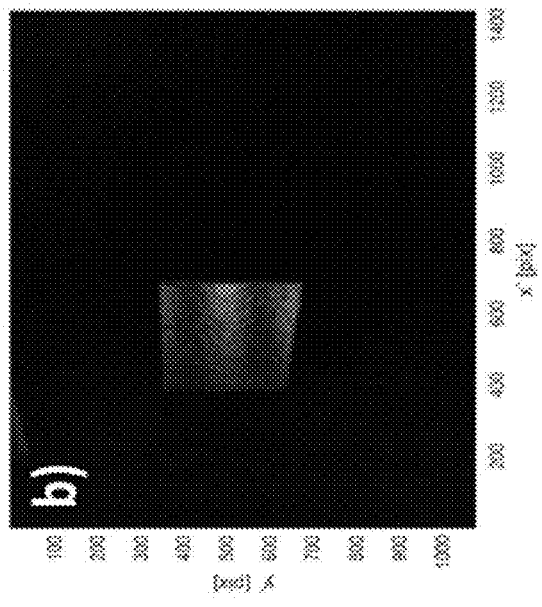
FIG. 4A depicts horizontal fringes within the effective measurement field for a planar object (i.e., plexiglass plate) in accordance with an illustrative embodiment.
Figure 4B:
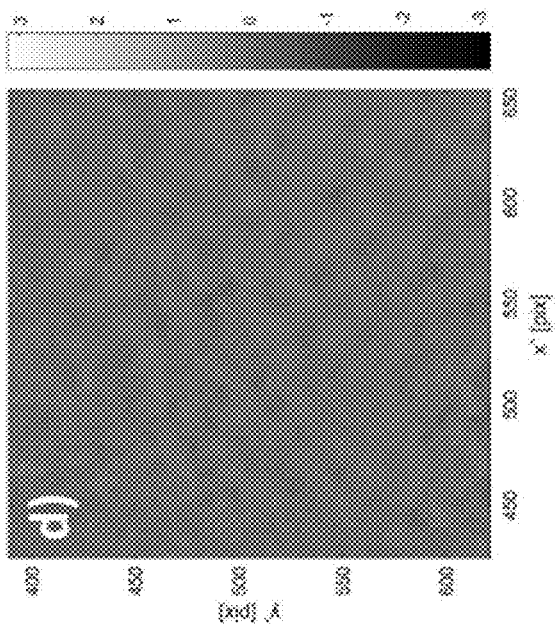
FIG. 4B depicts a horizontal fringe pattern reflected from the surface of plexiglass plate in accordance with an illustrative embodiment.
Figure 4C:
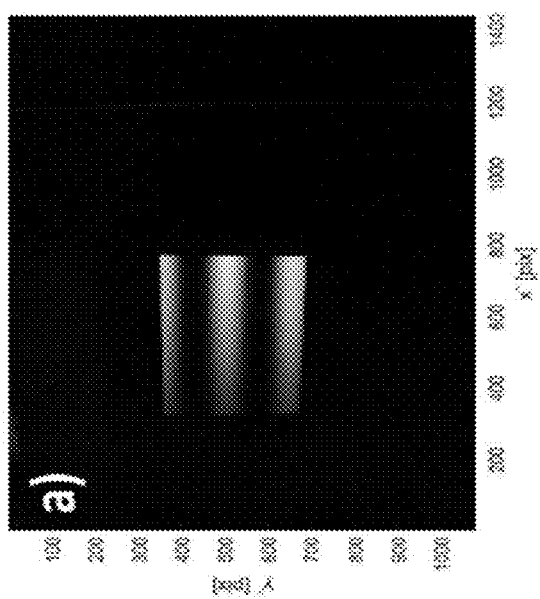
FIG. 4C depicts a calculated phase map based on the reflected horizontal fringe pattern in accordance with an illustrative embodiment.
Figure 4D:
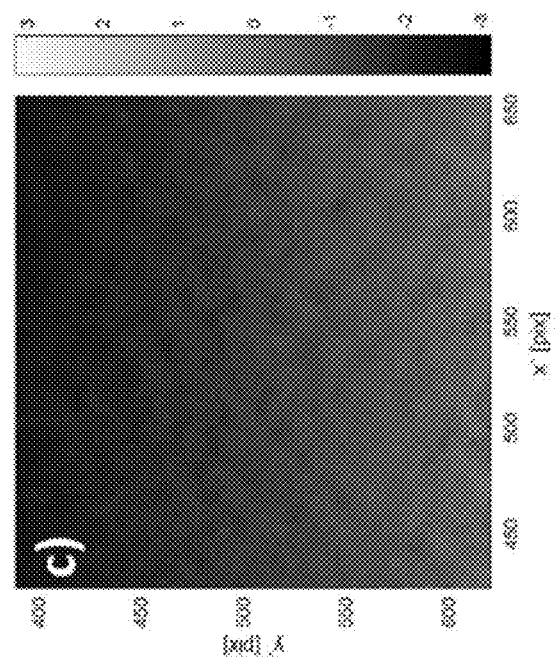
FIG. 4D depicts a calculated gradient map after high pass filtering in accordance with an illustrative embodiment.

The front-camera objectives of mobile device cameras commonly have a short focal length, which results in a large field of view. Unfortunately, this large field of view cannot be exploited in its entirety by the proposed system. A valid PMD measurement can only be taken at image pixels that observe a display pixel over the specular surface. This is because the mobile device cannot be held closer to the object surface than the minimum possible focus distance and the screen (e.g., liquid crystal display (LCD) screen) has a limited angular coverage. As a result, the number of pixels that produce valid measurements can be as small as 25% of the imaging field of view. FIG. 4A illustrates this problem with a planar object (plexiglass plate), which is placed at the minimum possible distance to the mobile device. Specifically, FIG. 4A depicts horizontal fringes within the effective measurement field for a planar object (i.e., plexiglass plate) in accordance with an illustrative embodiment. The plexiglass plate is larger than the field of view of the camera. Nevertheless, the pattern can only be observed in a small portion of the field of view. FIG. 4B depicts a horizontal fringe pattern reflected from the surface of plexiglass plate in accordance with an illustrative embodiment. FIG. 4C depicts a calculated phase map based on the reflected horizontal fringe pattern in accordance with an illustrative embodiment. FIG. 4D depicts a calculated gradient map after high pass filtering in accordance with an illustrative embodiment.

Figure 5A:
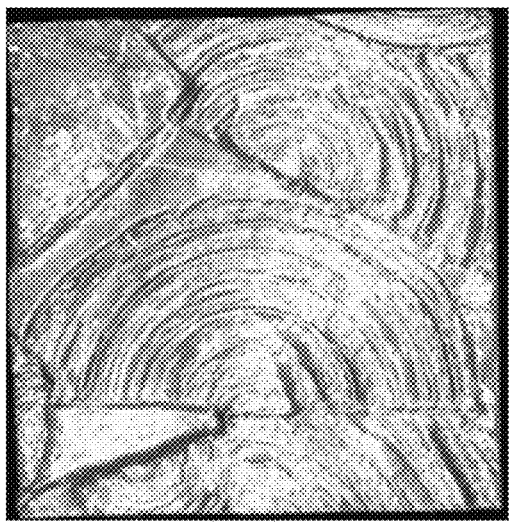
FIG. 5A depicts a first stained glass test tile in accordance with an illustrative embodiment.
Figure 5B:
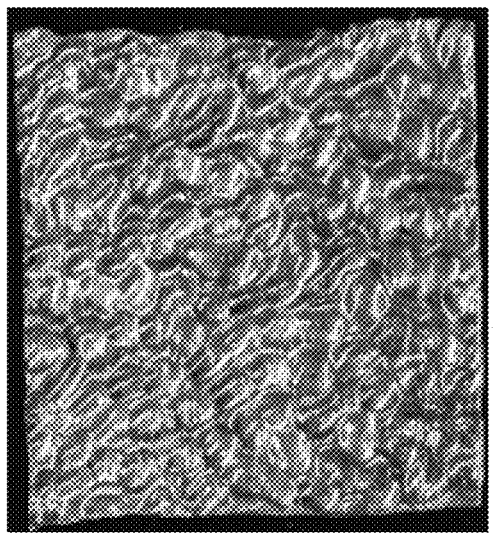
FIG. 5B depicts a second stained glass test tile in accordance with an illustrative embodiment.
Figure 5C:
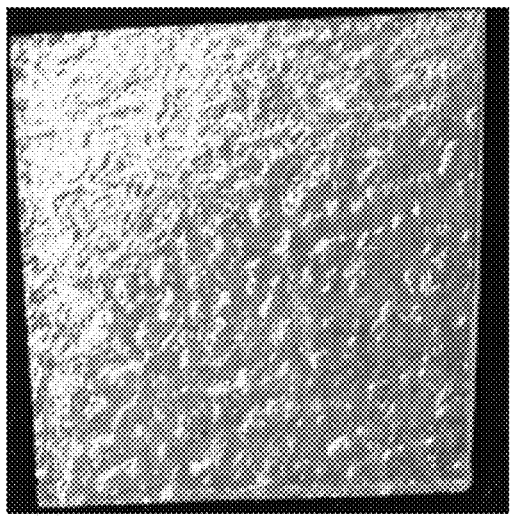
FIG. 5C depicts a third stained glass test tile in accordance with an illustrative embodiment.
Figure 5D:
FIG. 5D depicts a fourth stained glass test tile in accordance with an illustrative embodiment.

The inventors have also used the proposed system to evaluate the surface normal map of stained glass test tiles. FIG. 5A depicts a first stained glass test tile in accordance with an illustrative embodiment. FIG. 5B depicts a second stained glass test tile in accordance with an illustrative embodiment. FIG. 5C depicts a third stained glass test tile in accordance with an illustrative embodiment. FIG. 5D depicts a fourth stained glass test tile in accordance with an illustrative embodiment. The stained glass test tiles have an approximately square shape with edge length of about 50 mm. The surface structure complexity and angular distribution of surface normals increase from the sample of FIG. 5A to the sample of FIG. 5D.

Figure 6B:
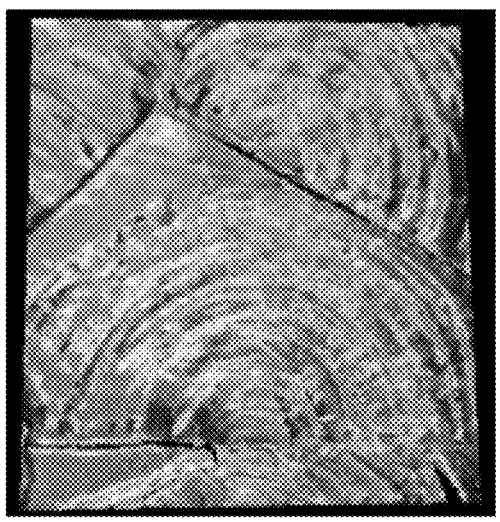
FIG. 6B depicts a surface normal map calculated from measurements of the second stained glass test tile in accordance with an illustrative embodiment.
Figure 6D:
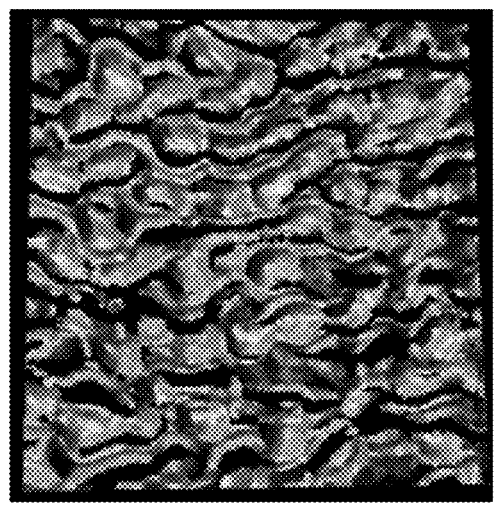
FIG. 6D depicts a surface normal map calculated from measurements of the fourth stained glass test tile in accordance with an illustrative embodiment.
Figure 6A:
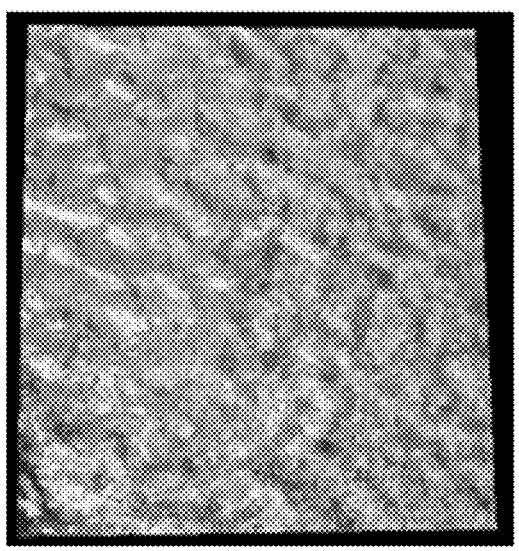
FIG. 6A depicts a surface normal map calculated from measurements of the first stained glass test tile in accordance with an illustrative embodiment.
Figure 6C:
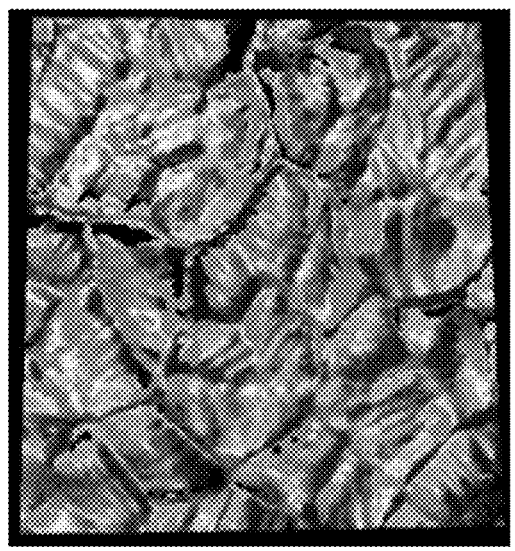
FIG. 6C depicts a surface normal map calculated from measurements of the third stained glass test tile in accordance with an illustrative embodiment.

Most of the tiles in the test set display a size and surface normal distribution small enough to be evaluated from a single view. FIG. 6A depicts a surface normal map calculated from measurements of the first stained glass test tile in accordance with an illustrative embodiment. FIG. 6B depicts a surface normal map calculated from measurements of the second stained glass test tile in accordance with an illustrative embodiment. FIG. 6C depicts a surface normal map calculated from measurements of the third stained glass test tile in accordance with an illustrative embodiment. FIG. 6D depicts a surface normal map calculated from measurements of the fourth stained glass test tile in accordance with an illustrative embodiment. For illustration purposes, the measurement process is described for the 'easiest' test tile (i.e., FIG. 5A). The test tile is placed at a position in the field of view of the front-facing camera of the mobile device, where the reflected display of the mobile device can be observed. The intensity in each image pixel (x',y') can be expressed as:

$$I(x',y')=A(x',y')+B(x',y')\cdot\cos(\phi(x',y')).\qquad\text{Eq. 1:}$$

As shown above, equation 1 contains three unknowns per pixel. The (desired) phase $\phi(x',y')$ of the sinusoidal pattern, which correlates display pixels with image pixels is a first unknown. Additional unknowns are $A(x',y')$ and $B(x',y')$, which contain information about the unknown bias illumination and object reflectivity. This means that at least three equations are required to calculate $\phi(x',y')$. For each pattern direction, these equations are taken from the four acquired phase-shift images, where the intensity in each image pixel for the $m^{th}$ phase shift is:

$$I_m(x',y')=A(x',y')+B(x',y')\cdot\cos(\phi(x',y')-\phi_m),\text{ where:}\qquad\text{Eq. 2:}$$

$$\phi_m=(m-1)\pi/2.\qquad\text{Eq. 3:}$$

Finally, $\phi(x',y')$ can be evaluated by:

$$\phi(x',y')=\arctan(I_2(x',y')-I_4(x',y'))/(I_1(x',y')-I_3(x',y')).\qquad\text{Eq. 4:}$$

This procedure is performed for each pattern direction, leading to phase maps $\phi_x$ (x',y') and $\phi_y$ (x',y') for the horizontal and vertical fringe direction, respectively. A phase map for the horizontal fringe direction is shown in FIG. 4C (image cropped for better visualization). This phase map is equivalent to the surface gradient in the vertical direction plus a low frequency phase offset that is dependent on the relative position between camera and object, and any distortion present in the camera objective. In conventional PMD setups, this offset is removed by employing a calibration process whereby the phase map is first measured for a planar mirror, then subtracted from the measured phase. A calibration process could also be performed for the systems described herein. However, for the desired qualitative measurements of objects like stained glass artworks, one can avoid this operation and the respective phase calibration by exploiting a-priori knowledge about the objects being imaged. For the example of stained glass, it is known that the overall shape is always flat.

As a result of this a-priori knowledge, the unknown phase offset can be removed by high pass filtering the unwrapped phase map. The high pass filtered phase maps $\tilde{\phi}_x$ and $\tilde{\phi}_y$ are then equivalent to the surface gradient maps in x- and y-direction. It is noted that the filtering operation also compensates for the nonlinear photometric responses of the display and camera, avoiding an additional calibration procedure. Moreover, the assumption of a flat object resolves the depth-normal ambiguity of deflectometry measurements, which typically requires 2 cameras to resolve. The resulting horizontal gradient map is displayed in FIG. 4D. The results were calculated using the pattern frequency v=1, corresponding to one sinusoidal period displayed over the entire width of the display screen. Measurements with frequencies v>1 and subsequent multi-frequency phase unwrapping can be performed as well. These measurements are not described in detail herein because the approach does not significantly improve the performance of 3D surface measurements and involves more time to acquire the necessary fringe-images.

To image objects which are not flat, it is apparent that the assumption of flatness cannot be used to avoid manual calibration. Rather, a general guess at the surface shape is made, and measurements are made to determine whether the measurements confirm that the guess was accurate. If the measurements confirm that the guess is accurate, self-calibration can be used (i.e., the assumed information regarding the shape is the guess). If the measurements indicate that the guess is inaccurate, subsequent guesses are made until the measurements confirm a correct guess.

The surface normal can be computed directly from the estimated phase maps via Equation 5 below:

$$\vec{n} = \frac{1}{\sqrt{\tilde{\phi}_x^2 + \tilde{\phi}_y^2 + 1}} \cdot \begin{pmatrix} \tilde{\phi}_x \\ \tilde{\phi}_y \\ -1 \end{pmatrix}, \quad \text{Eq. 5}$$

where $\tilde{\phi}_x$ and $\tilde{\phi}_y$ denote the gradient for the horizontal and vertical direction, respectively. As discussed above, FIGS. 6A-6D depict the calculated normal maps of all 4 test tiles. The 4 normal maps are shaded with a specular finish and slightly tilted for visualization purposes. It can be seen that the characteristic surface structures are well resolved. The black spots in the normal maps are produced by surface points where the surface normal resulted in no measured signal (i.e., the camera was not able to see the display).

Figure 7A:
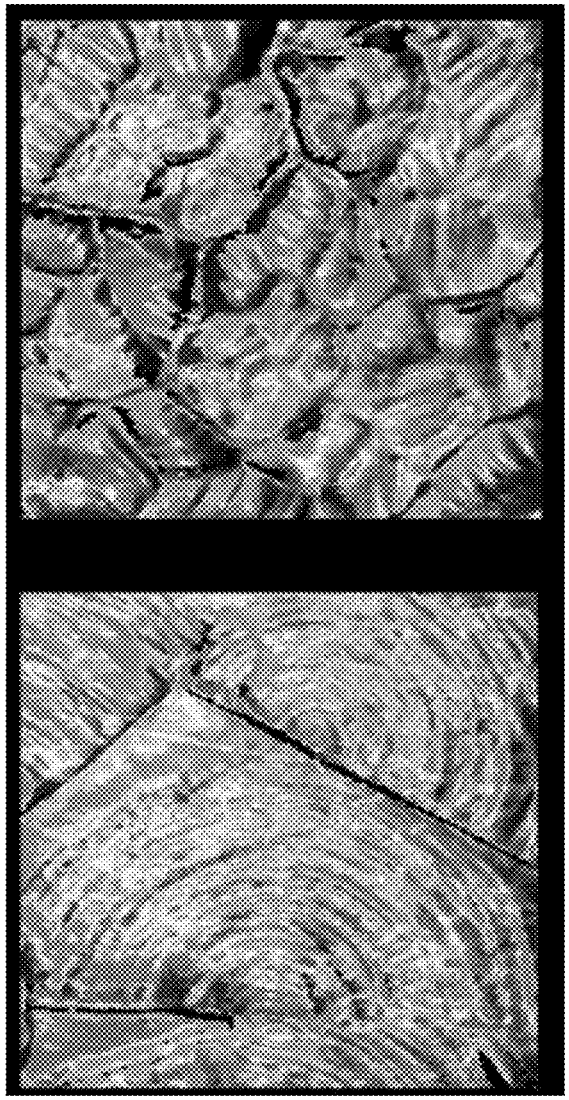
FIG. 7A depicts normal map measurement results with room light for the second and third stained glass test tiles in accordance with an illustrative embodiment.
Figure 7B:
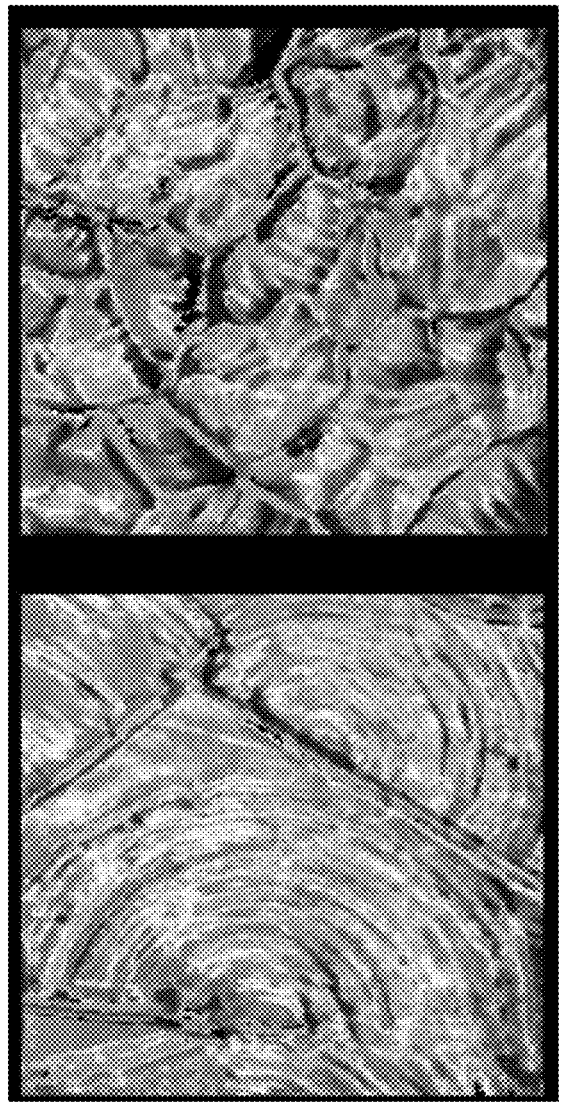
FIG. 7B depicts normal map measurement results for the second and third stained glass test tiles from handheld measurements in accordance with an illustrative embodiment.

To test the robustness of the qualitative measurement results against different environmental conditions, additionally acquired measurements were added for two of the four tiles with ambient room lighting and with performing a hand-held measurement without mounting the device. The results are shown in FIG. 7. Specifically, FIG. 7A depicts normal map measurement results with room light for the second and third stained glass test tiles in accordance with an illustrative embodiment. FIG. 7B depicts normal map measurement results for the second and third stained glass test tiles from handheld measurements in accordance with an illustrative embodiment.

The measurement taken with ambient room lighting (FIG. 7A) shows no significant degradation in performance. This is understandable because the brightness of the room light was moderate and the signal-to-noise ratio (SNR) was not reduced significantly. Under these conditions, the four-phase shift algorithm effectively compensates for bias illumination. For the free-hand guided measurement, motion artifacts in the evaluated phase map are expected. These artifacts can be seen at the slightly blurred edges in FIG. 7B. The fact that the visible artifacts occur only at edges is a consequence of the low frequency v=1 used to acquire these measurements. Higher frequencies may result in more prominent artifacts, as for example commonly observed in triangulation-based fringe projection.

Figure 8:
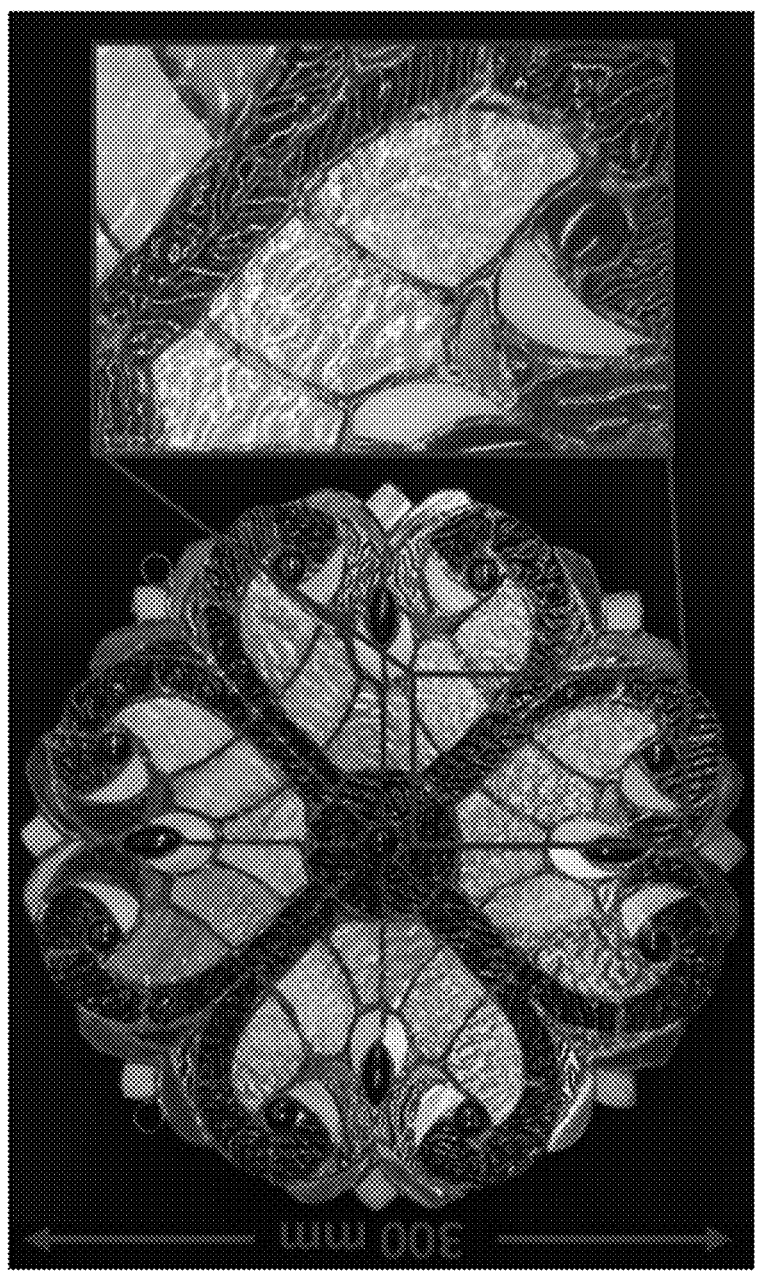
FIG. 8 depicts a circular shaped stained glass structure imaged using registration in accordance with an illustrative embodiment.

A single view measurement is often not enough to capture an extended specular object with large normal variation in its entirety. This is not only because of the limited effective field of view of mobile devices, but also because the large normal variation of some surfaces cannot be captured from a single viewing angle. A solution to this problem is to acquire and register multiple views of the object being imaged. Described below are qualitative results that demonstrate the feasibility of this approach. A circular shaped glass painting with a diameter of 300 mm was imaged. FIG. 8 depicts the circular shaped stained glass structure imaged using registration in accordance with an illustrative embodiment. From the magnification window in FIG. 8, it can be seen that the glass pieces in this stained glass structure exhibit high frequency surface features. Moreover, some glass pieces are milky, which introduces an additional challenge for the surface measurement. For the results shown below, one half of the glass structure was imaged by acquiring 14 single views under different viewing angles and positions.

To assist in registration, an additional 'white image' (i.e., an image of the glass illuminated only by diffuse room light) of the glass was acquired at each viewing position. The registration transformation for the normal maps acquired at each single view was calculated from these white images. Performing registration with the white images was found to be more robust than registration with calculated normal maps. For registration, feature based registration algorithms provided by the Matlab Computer Vision Toolbox were used. In alternative implementations, different registration algorithms may be used. It is noted that the use of images which are captured under diffuse illumination is beneficial in this case, since the diffuse illumination makes the object look similar from different viewing angles. Additionally, no strong specular reflections (which look different from different viewing angles) disturb the feature extraction of the registration algorithm. Using this technique, subsequent views were able to be registered without applying markers or other fiducials onto the object surface (i.e., registration was performed just by using the texture of the object itself).

Figure 9A:
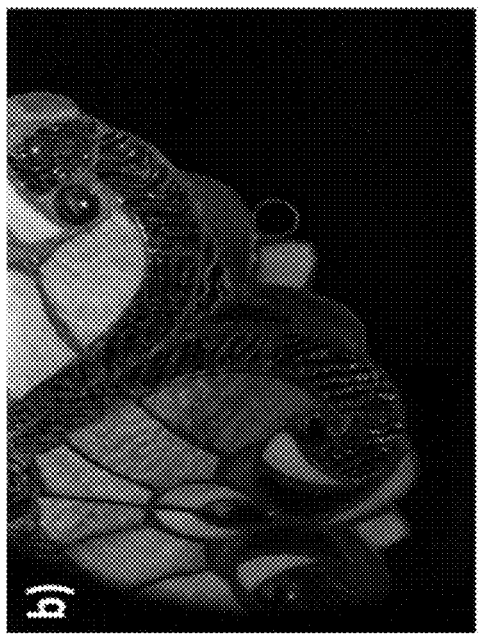
FIG. 9A shows a captured white image from a first view in accordance with an illustrative embodiment.
Figure 9B:
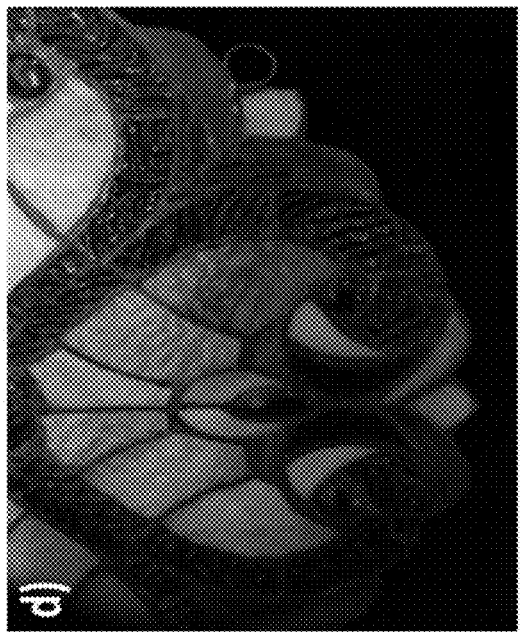
FIG. 9B shows a captured white image from a second view in accordance with an illustrative embodiment.
Figure 9C:
FIG. 9C depicts detected and mapped features in the two white images in accordance with an illustrative embodiment.
Figure 9D:
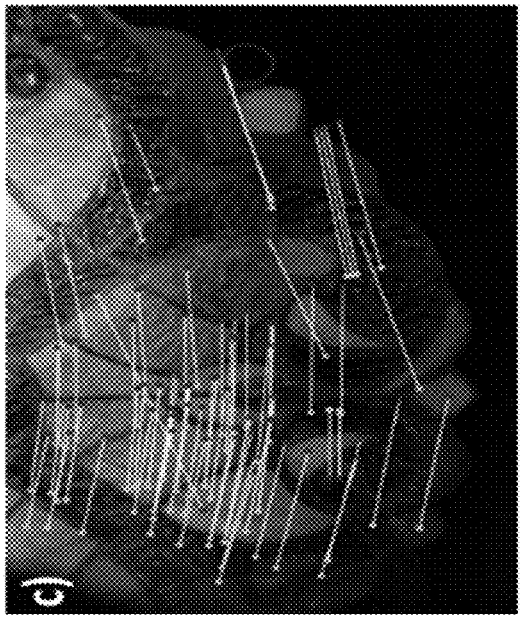
FIG. 9D depicts the registered white images in accordance with an illustrative embodiment.

FIGS. 9A-9D depict the registration results. FIG. 9A shows a captured white image from a first view in accordance with an illustrative embodiment. FIG. 9B shows a captured white image from a second view in accordance with an illustrative embodiment. FIG. 9C depicts detected and mapped features in the two white images in accordance with an illustrative embodiment. FIG. 9D depicts the registered white images in accordance with an illustrative embodiment.

It can be seen that the feature extraction and the subsequent registration transformation is applied on the whole field of view of the camera (not only on the limited field in the middle) in order to detect a large number of features with high quality. In this case it may be beneficial to perform a calibration of the front camera (e.g. with a checkerboard) to compensate for distortion. This reduces the registration error significantly. It should be also noted that such a distortion correction was avoided for the previous single-view measurements, since most of the signal was measured in the middle of the field of view, where the distortions are small.

Figure 10A:
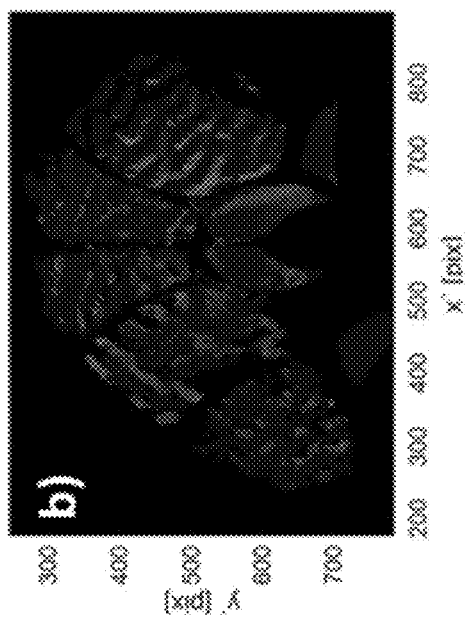
FIG. 10A depicts a normal map of the stained glass surface acquired from a first viewpoint in accordance with an illustrative embodiment.
Figure 10C:
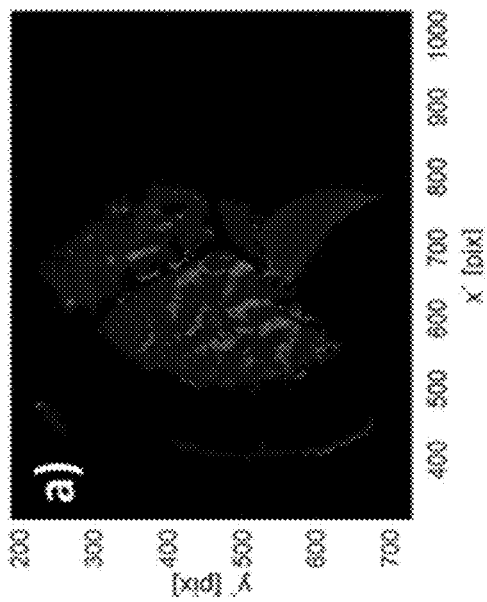
FIG. 10C depicts a normal map of the stained glass surface under a first alternative shading in accordance with an illustrative embodiment.
Figure 10B:
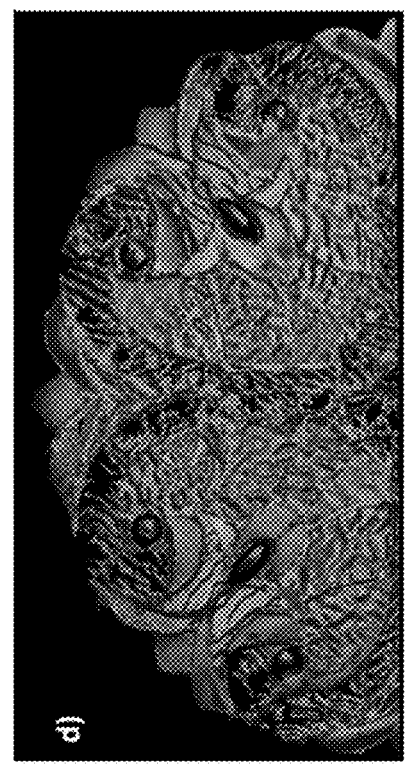
FIG. 10B depicts a normal map of the stained glass surface acquired from a second viewpoint in accordance with an illustrative embodiment.
Figure 10D:
FIG. 10D depicts a normal map of the stained glass surface under a second alternative shading in accordance with an illustrative embodiment.

The measurement results from the registration procedure described above are displayed in FIG. 10. FIG. 10A depicts a normal map of the stained glass surface acquired from a first viewpoint in accordance with an illustrative embodiment. FIG. 10B depicts a normal map of the stained glass surface acquired from a second viewpoint in accordance with an illustrative embodiment. FIG. 10C depicts a normal map of the stained glass surface under a first alternative shading in accordance with an illustrative embodiment. FIG. 10D depicts a normal map of the stained glass surface under a second alternative shading in accordance with an illustrative embodiment. As discussed above, the normal map is the compilation of 14 single views which are stitched together via registration.

It can be seen from the views of FIG. 10 that the 3D surface is recovered beyond the region in the center of the field of view. Depending on the orientation of the glass surface relative to camera and display, it is principally possible to detect normals within the whole field of view, though they might be sparse. As shown in the alternative shading views of FIGS. 10C and 10D, most parts of the object's surface are densely reconstructed and the high frequency structures of the individual glass pieces are visible. However, some black regions are still present, mostly from the blue glass pieces in the painting. The structure of these pieces displays extraordinary high hills and deep craters, producing a wide distribution of normals that can be measured effectively using more than the 14 views of the present example.

Figure 11B:
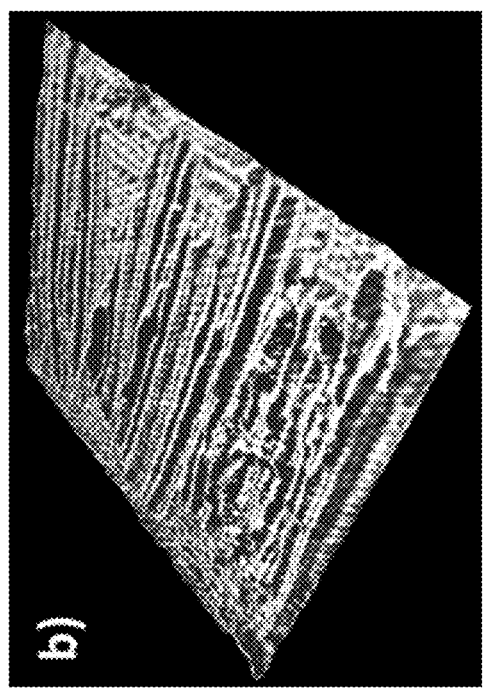
FIG. 11B depicts a first view of the surface shape of the marked region in FIG. 11A in accordance with an illustrative embodiment.
Figure 11C:
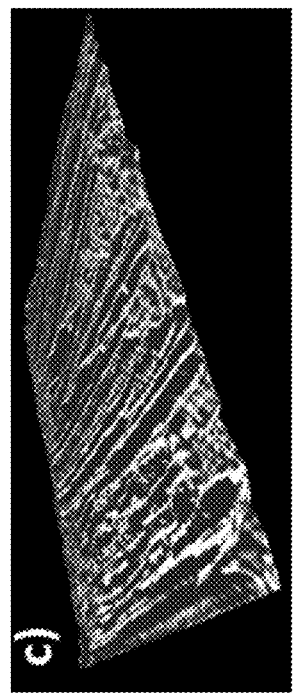
FIG. 11C depicts a second view of the surface shape of the marked region in FIG. 11A in accordance with an illustrative embodiment.
Figure 11A:
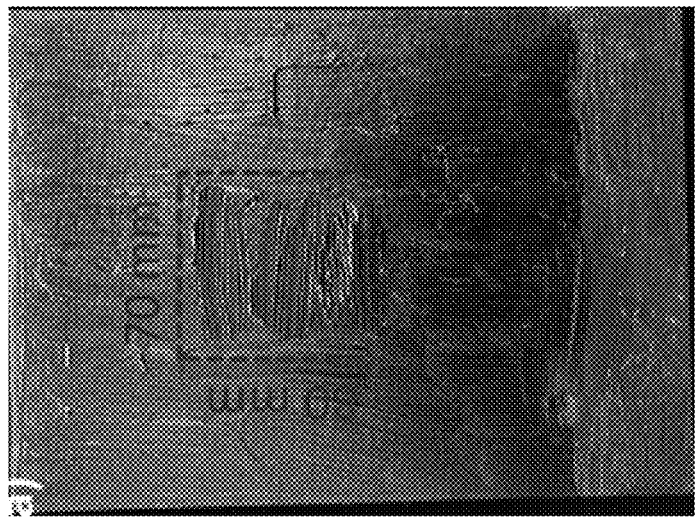
FIG. 11A is an image of a painting being imaged in accordance with an illustrative embodiment.

As discussed above, the proposed methods and systems are not limited to the 3D measurement of stained glass artworks. A 3D surface acquisition using the proposed uncalibrated method is possible with virtually any surface for which the overall shape of the object is flat and the surface under test is relatively shiny. FIG. 11 depicts the surface measurement of an oil painting. FIG. 11A is an image of the painting being imaged in accordance with an illustrative embodiment. The surface normals of the black region in the dashed box (approximately 70 mm×80 mm) was acquired using the proposed system. FIG. 11B depicts a first view of the surface shape of the marked region in FIG. 11A in accordance with an illustrative embodiment. FIG. 11C depicts a second view of the surface shape of the marked region in FIG. 11A in accordance with an illustrative embodiment. In FIGS. 11B and 11C, the z-component was exaggerated for display purposes. The surface shapes were calculated by integration of the acquired normal map. Specifically, for a better visualization of the hills and valleys of the brushstrokes, the acquired normal map was integrated to a depth map, using the Frankot-Chellappa surface integration algorithm. In alternative implementations, a different integration algorithm may be used. It can be seen that the brushstrokes and canvas are nicely resolved in the surface shape images using the proposed system.

It should be noted that the three-dimensional analysis of painting surfaces is of great interest for the cultural heritage community. The ability to separate surface texture from its shape or slope data is an important tool for the analysis of painting techniques (e.g. by looking at the directions of brush strokes) and monitoring of pigment degradation in paintings. The proposed mobile imaging methods and systems are well suited for the analysis of paintings in the wild (e.g., directly on a museum wall).

Figure 12C:
FIG. 12C depicts normal maps of a nickel and a dime in accordance with an illustrative embodiment.
Figure 12B:
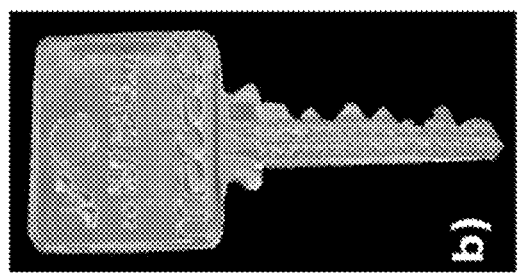
FIG. 12B depicts a measured normal map of the key of FIG. 12A in accordance with an illustrative embodiment.
Figure 12A:
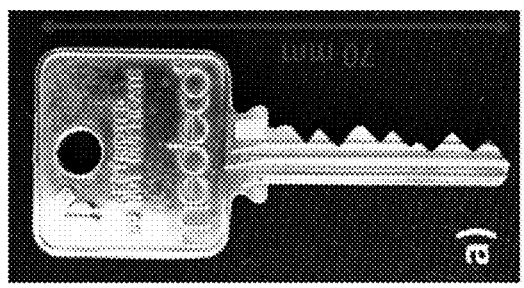
FIG. 12A depicts an image of a key in accordance with an illustrative embodiment.
Figure 12E:
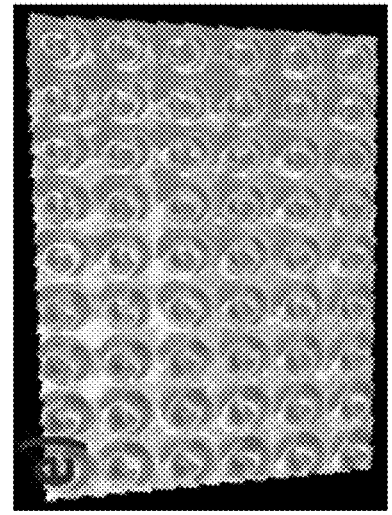
FIG. 12E depicts a measured normal map of the circuit board of FIG. 12D in accordance with an illustrative embodiment.
Figure 12D:
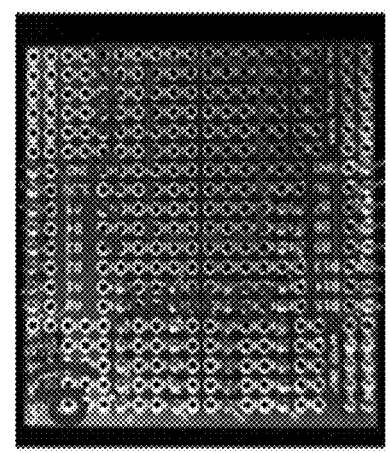
FIG. 12D depicts an image of a circuit board in accordance with an illustrative embodiment.

Another potential field of application of the proposed methods and systems is the 3D acquisition of technical metallic surfaces. Measurement examples of such surfaces are shown in FIG. 12. FIG. 12A depicts an image of a key in accordance with an illustrative embodiment. FIG. 12B depicts a measured normal map of the key of FIG. 12A in accordance with an illustrative embodiment. FIG. 12C depicts normal maps of a nickel and a dime in accordance with an illustrative embodiment. FIG. 12D depicts an image of a circuit board in accordance with an illustrative embodiment. FIG. 12E depicts a measured normal map of the circuit board of FIG. 12D in accordance with an illustrative embodiment. As shown, imprinted letters and symbols are resolved, both for the key as well as for the coins, using the proposed system. In the image of the circuit board, the diameter of one single metallic ring is only about 2 mm, and it can be seen that these rings are well resolved.

Figure 13B:
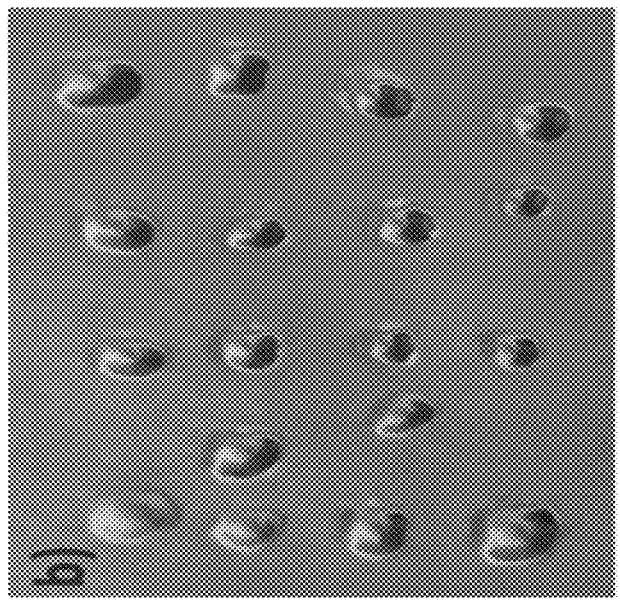
FIG. 13B depicts a normal map of the pattern of water drops depicted in FIG. 13A in accordance with an illustrative embodiment.
Figure 13A:
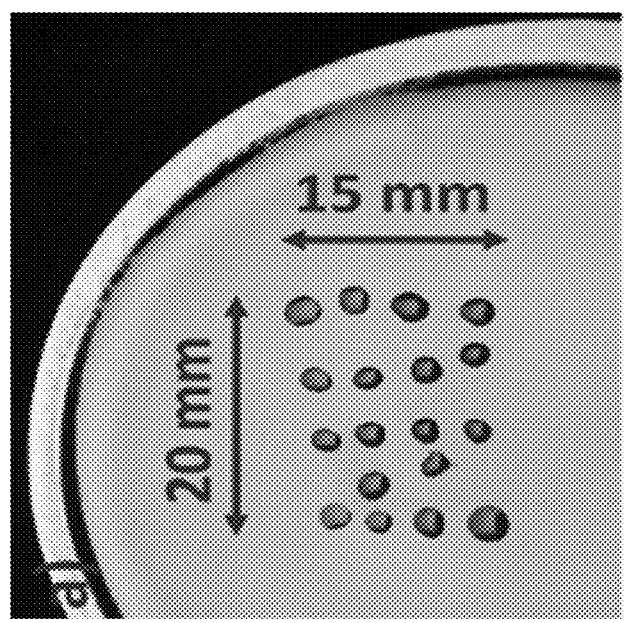
FIG. 13A depicts a pattern of water drops on an enameled surface in accordance with an illustrative embodiment.

Another demonstrated the capability of the proposed system to measure fluid surfaces (e.g., for the analysis of surface tension). FIG. 13A depicts a pattern of water drops on an enameled surface in accordance with an illustrative embodiment. FIG. 13B depicts a normal map of the pattern of water drops depicted in FIG. 13A in accordance with an illustrative embodiment. As shown, the shape of each drop and the overall pattern of drops are both clearly visible from the normal map.

Many of the imaging applications described herein are made feasible or more convenient by incorporation of a mobile device into the system. For example, as discussed above, it can be difficult or impossible to conduct a 3D surface analysis of a rare painting without the use of a mobile device. However, in alternative embodiments, any of the operations and techniques described herein can be used with a stationary computing device (e.g., desktop computer, kiosk computer, permanently mounted computing device, etc.) that includes a screen and a camera, as described herein.

It is to be understood that any of the operations/processes described herein may be performed at least in part by a computing system that includes a processor, memory, transceiver, user interface, etc. The described operations/processes can be implemented as computer-readable instructions stored on a computer-readable medium such as the computer system memory. Upon execution by the processor, the computer-readable instructions cause the computing system to perform the operations/processes described herein.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A three-dimensional (3D) imaging system comprising:
a mobile device that includes:
a display screen configured to display a series of patterns onto an object that is to be imaged; and
a front-facing camera configured to capture reflections of the series of patterns off of the object;
a controller that is configured to control a timing of the series of patterns that appear on the display screen and activation of the front-facing camera in relation to the appearance of the series of patterns; and
a server that is in communication with one or more of the mobile device and the controller, wherein the server is configured to:
process a plurality of sets of captured reflections to generate a plurality of normal maps, wherein each set of captured reflections corresponds to a different position of the mobile device relative to the object; and
combine the plurality of normal maps via a registration procedure to generate a combined normal map that represents an entire surface of the object, wherein the server performs the registration procedure using a plurality of white images, and wherein each white image corresponds to the different position of the mobile device relative to the object.

2. The system of claim 1, wherein the controller includes a processor configured to self-calibrate the system based on an assumption regarding a shape of the object.

3. The system of claim 1, wherein the server is configured to integrate the normal map to determine a surface shape of at least the portion of the object.

4. The system of claim 3, wherein the server integrates the normal map into a depth map using a surface integration algorithm.

5. The system of claim 3, wherein the server is configured to analyze the surface shape of the object to determine a source of the object.

6. The system of claim 5, wherein the object comprises a stained glass surface or a painting.

7. The system of claim 1, wherein the plurality of white images are captured under diffuse illumination of the object.

8. The system of claim 1, further comprising a mount configured to maintain the mobile device at a specific orientation relative to the object.

9. The system of claim 1, wherein the series of patterns comprises three or more phase-shifted sinusoidal patterns.

10. The system of claim 1, wherein the series of patterns comprises a series of dot patterns, a series of line patterns, or an intensity gradient.

11. The system of claim 2, wherein the assumption regarding the shape of the object is that the object is flat.

12. A method for performing three-dimensional (3D) imaging, the method comprising:
- displaying, on a display screen of a mobile device, a series of patterns onto an object that is to be imaged;
- capturing, by a front-facing camera of the mobile device, reflections of the series of patterns off of the object;
- controlling, by a controller that is in communication with the mobile device, a timing of the series of patterns that appear on the display screen and activation of the front-facing camera in relation to the appearance of the series of patterns;
- processing, by a server in communication with one or more of the mobile device and the controller, a plurality of sets of captured reflections to generate a plurality of normal maps, wherein each set of captured reflections corresponds to a different position of the mobile device relative to the object;
- receiving, by the server, a plurality of white images, wherein each white image corresponds to the different position of the mobile device relative to the object and
- combining, by the server, the plurality of normal maps via a registration procedure to generate a combined normal map that represents an entire surface of the object, wherein the server performs the registration procedure using the plurality of white images.

13. The method of claim 12, further comprising self-calibrating, by a processor, the system based on an assumption regarding a shape of the object.

14. A three-dimensional (3D) imaging system comprising:
- a first mobile device that includes a display screen configured to display a series of patterns onto an object that is to be imaged; and
- a second mobile device that includes:
- a rear-facing camera configured to capture reflections of the series of patterns off of the object; and
- a controller that is configured to control a timing of the series of patterns that appear on the display screen and activation of the rear-facing camera in relation to the appearance of the series of patterns; and
- a server that is in communication with one or more of the first mobile device, the second mobile device, and the controller, wherein the server is configured to:
- process a plurality of sets of captured reflections to generate a plurality of normal maps, wherein each set of captured reflections corresponds to a different position of the second mobile device relative to the object and
- combine the plurality of normal maps via a registration procedure to generate a combined normal map that represents an entire surface of the object, wherein the server performs the registration procedure using a plurality of white images, and wherein each white image corresponds to the different position of the second mobile device relative to the object.

15. The system of claim 14, further comprising a mount configured to hold the first mobile device and the second mobile device such that the display screen of first mobile device faces an opposite direction of a display screen of the second mobile device.

* * * * *